United States Patent
Aldaz et al.

(10) Patent No.: US 6,975,670 B1
(45) Date of Patent: Dec. 13, 2005

(54) MANAGING ASSIGNED FINGERS IN WIRELESS TELECOMMUNICATION USING A FINGER LOCK MECHANISM

(75) Inventors: Luis Aldaz, San Jose, CA (US); Daniel Jeng Hsia, Del Mar, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 800 days.

(21) Appl. No.: 09/678,472

(22) Filed: Oct. 2, 2000

(51) Int. Cl.[7] .............................. H04B 1/69; H04B 7/216
(52) U.S. Cl. ....................... 375/144; 375/150; 370/335
(58) Field of Search .................................. 375/150, 347, 375/144

(56) References Cited

U.S. PATENT DOCUMENTS

| | | | | |
|---|---|---|---|---|
| 5,490,165 A | * | 2/1996 | Blakeney et al. | 370/335 |
| 5,754,583 A | * | 5/1998 | Eberhardt et al. | 375/147 |
| 6,130,923 A | * | 10/2000 | Levin et al. | 375/347 |
| 6,201,827 B1 | * | 3/2001 | Levin et al. | 375/150 |
| 6,414,988 B1 | * | 7/2002 | Ling | 375/150 |
| 6,633,552 B1 | * | 10/2003 | Ling et al. | 370/318 |

* cited by examiner

Primary Examiner—Stephen Chin
Assistant Examiner—Cicely Ware
(74) Attorney, Agent, or Firm—Peter Zawilski

(57) ABSTRACT

Managing assigned fingers in wireless telecommunication, such as Code Division Multiple Access (CDMA), using a finger lock mechanism. The method includes a series of steps, including a first step of receiving a finger assignment from a searcher portion of a communication device. Next, the signal-strength of the finger assignment is determined, and a time period over which the signal-strength exists is determined. The finger assignment is then compared to multiple signal-strength thresholds and to a time threshold. In the next step, the finger assignment is evaluated for a combing operation based upon which of the aforementioned thresholds it satiates. In particular, the finger assignment is enabled for a combining operation if it is a new finger assignment or if it continues to satiate a combine signal-strength threshold. Alternatively, the finger assignment is not enabled for combining but neither is it deassigned (e.g., a locked state) if it fails to satiate the combine signal-strength threshold but does satiate the lock signal-strength threshold without exceeding the time threshold. Lastly, control of the finger assignment is passed to the searcher if the finger assignment fails to satiate the lock signal-strength threshold.

31 Claims, 9 Drawing Sheets

MANAGING ASSIGNED FINGERS IN WIRELESS TELECOMMUNICATION USING A FINGER LOCK MECHANISM

TECHNICAL FIELD

The present claimed invention relates to the field of wireless communication. Specifically, the present claimed invention relates to an apparatus and a method for managing assigned fingers in wireless communication device by using a finger lock mechanism.

BACKGROUND ART

Wireless telephony, e.g. cellular phone use, is a widely-used mode of communication today. Variable rate communication systems, such as Code Division Multiple Access (CDMA) spread spectrum systems, are among the most commonly deployed wireless technologies. Industry Standard (IS-95) provides details on conventional CDMA standards. Because of increasing demand and limited resources for this communication medium, a need arises to improve the capacity, fidelity, and performance of devices and methods for wireless communication.

Referring to prior art FIG. 1A, an illustration of multipath signal propagation between a conventional base station and a cell phone is shown. A conventional base station 104 transmits a signal to a mobile unit 102, e.g., a cell phone. Typically, the signal contains pilot information, that identifies the base station, and data information, such as voice content. A signal that can be transmitted directly to mobile unit 102 without interference, such as first signal 106a, which provides the strongest signal. However, given the power limitations at which base station 104 can transmit the signal, and given the noise that a signal may pick up, a need arises to improve the power and the SNR of the signal captured at the mobile unit.

Conventional methods combine transmitted signals that travel different paths to mobile unit 102. The multiple paths arise because of natural and man-made obstructions, such as building 108, hill 110, and surface 112, that deflect the original signal. Because of the paths over which these other signals travel, a time delay and performance deterioration intrinsically arises in the synchronization-sensitive and noise-sensitive data that is transmitted from base station 104 to mobile unit 102. To provide the strongest possible signal to a mobile unit, two or more of the signals from these multiple paths, e.g. path 106a–106d, may be combined.

Corruption of a transmitted signal falls into two general categories: slowly-varying channel impairment and fast fading variation. Slowly-varying channel impairment arises from factors such as log-normal fading, or shadowing caused by movement or blocking from objects, as shown in prior art FIG. 1A, or from slow fading. Slower variations, e.g., sub Hz, determine in effect, the "availability" of the channel. In contrast, only the fast fading variation affects the details of the received waveform structure and the interrelationships of errors within a message. Interference on a signal can be caused by moving objects that temporarily block the signal, such as moving object 113 that interferes with signal 106b of prior art FIG. 1A. Based upon the characteristic differences of these signals, a need arises for a method of capturing a signal while avoiding the detrimental characteristics of fast fading or short fading variation encountered at the receiving unit.

Referring now to prior art FIG. 1B, a graph of the signal strength of two conventional multipath signals over time is shown. These curves are provided to illustrate how a conventional demodulation finger would react to fading signals. Graphs 100b and 101b illustrate some weaknesses of the conventional method of managing assigned fingers. These weaknesses will be more specifically described in a following figure, prior art FIG. 1C. Graphs 100b and 101b have an abscissa 122 of time and an ordinate 120 of signal strength, e.g., signal-to-noise ratio (SNR). SNR can be a received pilot energy per chip, $E_c$, divided by a total received spectral density (noise and signal), $I_o$, thus yielding an Ec/Io ratio.

Third multipath signal 106c in graph 100b and second multipath signal 106b in graph 101b are shown as exemplary multipath signals received at mobile unit 102. Third multipath signal 106c exceeds threshold 126 early in time, e.g., as shown where solid line changes to dashed line. At time 122a, third multipath signal 106c fails to meet threshold 126. Shortly after time 122a, third multipath signal 106c regains its signal-strength value and exceeds threshold 126.

In contrast, second multipath signal 106b, shown in graph 101b, only satisfies threshold 126 after time 122b. Even then, second multipath signal 106b falls below threshold 126 shortly thereafter, at time 122c. Both signals 106b and 106c show fast fading variation, which is caused by interfering object 113 in the case of signal 106b, as shown in prior art FIG. 1A. Second multipath signal 106b would be deassigned 123 when it's signal-strength fell below threshold 126, then reassigned 124 when it rose back above threshold 126. This condition of continuously assigning, deassigning, and reassigning, at a high frequency is known as thrashing.

Referring now to FIG. 1C, a flowchart of a conventional process used for implementing fingers in a communication device is shown. Flowchart 100c begins with step 1002. In step 1002, an inquiry determines whether an assigned signal fails to meet a threshold for combining. If an assigned signal does fail to the single threshold, then flowchart 100c ends. If the assigned signal satisfies the threshold, then flowchart 100c ends. In step 1004, the finger assignment is immediately deassigned, e.g. because it failed to meet the threshold. Following step 1004, flowchart proceeds to step 1006. In step 1006, the communication device waits for the searcher to assign a new finger.

Prior art FIG. 1C presents several problems associated with the conventional management of assigned fingers. The first problem deals with thrashing. The second problem deals with unnecessary latency. In step 1002, the only criteria by which fingers are deassigned is a single threshold for combining the signal. This single threshold is shown in prior art FIG. 1B as threshold 126. By using only a single threshold, third multipath signal 106c is immediately deassigned, per step 1004, as soon as it fails threshold 126, e.g., at time 122a. Because of this limitation, one of the demodulating fingers must now wait for the searcher to identify a new multipath signal to be assigned, e.g., per step 1006. This latency is shown as the delay 128 between time 122a and 122b, where third pilot 106c is deassigned and second multipath signal 106b is assigned.

This latency, caused by reassignment, appears to be unnecessary in the case presented in prior art FIG. 1B. This is because third multipath 106c returns back to a satisfactory SNR level shortly after deassignment at time 122a, e.g., which is typical performance for short fade performance. In contrast, second multipath signal 106b, substituted for third multipath signal 106c, appears to be an inferior candidate because it fails the threshold more frequently over time. The latency may have an adverse effect on the quality of the signal presented by mobile unit 102 to a user, especially if it occurs frequently or unnecessarily. Hence, a need arises to prevent the problem of latency caused by frequent or unnecessary changes in finger assignment.

In a different scenario, if no other multipath signals are available for demodulation, and a demodulating finger is available, then second multipath signal 106b may be constantly assigned and deassigned from the given demodulating finger based on its performance. That is, second multipath signal 106b frequently crosses the threshold value, thereby causing the communication device to frequently assign, deassign, and reassign a multipath signal to a demodulating finger that has no other worthy candidate multipath signals. This phenomenon of frequent assigning and deassigning is referred to as "thrashing." Unfortunately, thrashing consumes a significant amount of system resources, such as CPU operations, by constantly performing tasks such as assigning and deassigning. Furthermore, thrashing may downgrade the quality of the output signal from the mobile unit 102. This is because the frequent changes in finger assignment, and its associated latency effects, may cause a perceptible degradation in the composite signal provided by the communication device to a user. Consequently, a need arises for a method of managing assigned fingers that avoids the problem of thrashing, and its associated side-effects.

In summary, an apparatus and a method are needed to improve the capacity, fidelity, and performance of digital communication. In particular, a need arises to improve the power and the SNR of the signal captured at the mobile unit. That is, a need arises for a method of capturing a signal while avoiding the detrimental characteristics of fast fading variation encountered at the receiving unit. Specifically, a need arises to prevent the problem of latency caused by frequent or unnecessary changes in finger assignment. Finally, a need arises for a method of managing assigned fingers that avoids the problem of thrashing.

DISCLOSURE OF THE INVENTION

The present invention provides a method and apparatus for improving the capacity, fidelity, and performance of digital communication. More specifically, the present invention provides a method that improves the power and the SNR of the signal received at mobile unit. The present invention provides a method of capturing a signal while avoiding the detrimental characteristics of fast fading variation encountered at the receiving unit. In particular, the present invention avoids the problem of latency caused by frequent or unnecessary changes in finger assignment. Finally, the present invention implements the aforementioned method without the detrimental effects of thrashing.

In one embodiment, the present invention recites a method for managing assigned fingers in Code Division Multiple Access (CDMA) telecommunication system using a finger lock algorithm. The method includes a series of steps, including a first step of receiving a finger assignment from a searcher portion of a communication device. In the next step, the signal-strength of the finger assignment is determined and filtered. Then, a time period over which the signal-strength exists is determined. The finger assignment can then be compared to one or more signal-strength thresholds and/or to a time threshold. In the next step, the finger assignment is evaluated for a combine operation based upon which of the aforementioned thresholds it satiates.

In particular, the last two steps of comparing and evaluating the finger assignment include several additional steps. The finger assignment is enabled for combining if is a new finger assignment or if it continues to satiate a "combine" signal-strength threshold. Alternatively, the finger assignment is not enabled for combining, but neither is it deassigned (e.g., a locked state), if it fails to satiate the combine signal-strength threshold but does satiate a "lock" signal-strength threshold without exceeding a "time" threshold. Lastly, control of the finger assignment is passed back to the searcher if the finger assignment fails to satiate the lock signal-strength threshold or the time threshold. By using multiple thresholds, and by using a time threshold, the present invention provides a method of managing assigned fingers that avoids thrashing and latency effects of unnecessary switching. Specifically, the multiple signal-strength thresholds and the time threshold essentially provide a buffer of signal-strength and of time, to account for short fading signals that can quickly recover their signal-strength. Thus buffer essentially dampens an otherwise over-responsive conventional system.

In another embodiment, the present invention recites a communication device including a transceiver, a processor, and a computer readable memory, all coupled to each other. The memory portion of the communication device contains data and program instructions that, when executed via the processor, implement the aforementioned method for managing assigned fingers in a communication device.

These and other objects and advantages of the present invention will become apparent to those of ordinary skill in the art after having read the following detailed description of the preferred embodiments which are illustrated in the various drawing figures.

BRIEF DESCRIPTION OF THE DRAWINGS

The accompanying drawings, which are incorporated in and form part of this specification, illustrate embodiments of the invention and, together with the description, serve to explain the principles of the invention. The drawings referred to in this description should be understood as not being drawn to scale except as specifically noted.

PRIOR ART

PRIOR ART

PRIOR ART

BEST MODE FOR CARRYING OUT THE INVENTION

Figure 1A:
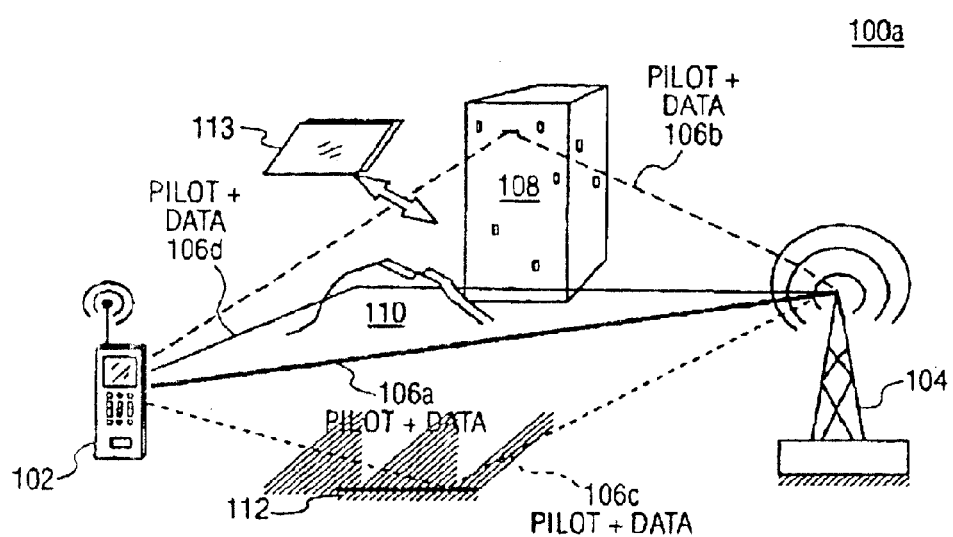
FIG. 1A is an illustration of multipath signal propagation between a conventional base station and a conventional mobile unit.
Figure 1B:
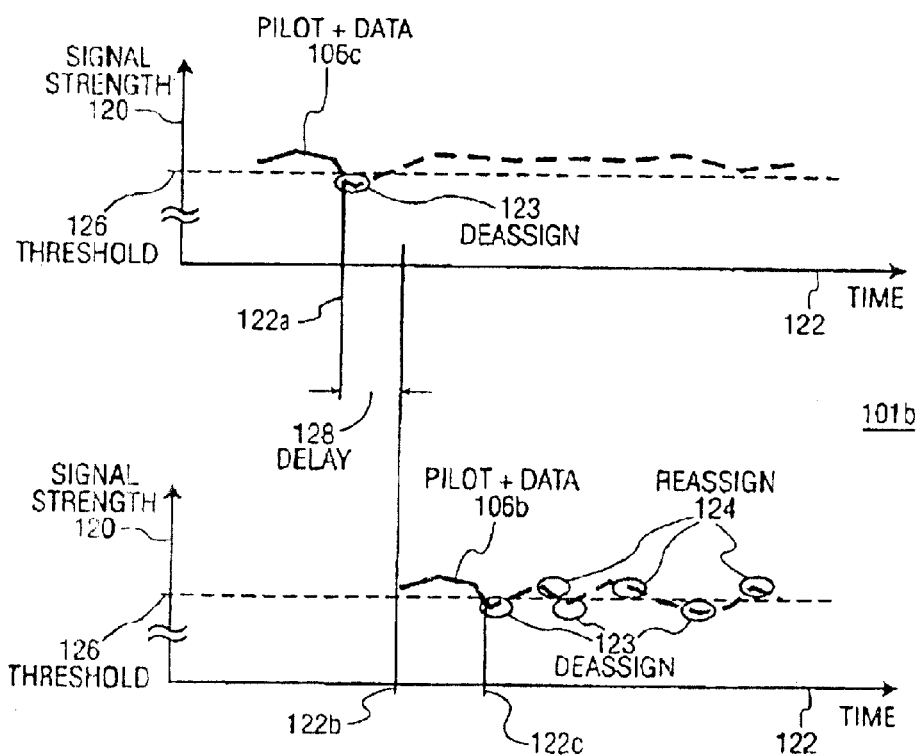
FIG. 1B is graph of the signal strength of two conventional multipath signal-strengths over time.
Figure 1C:
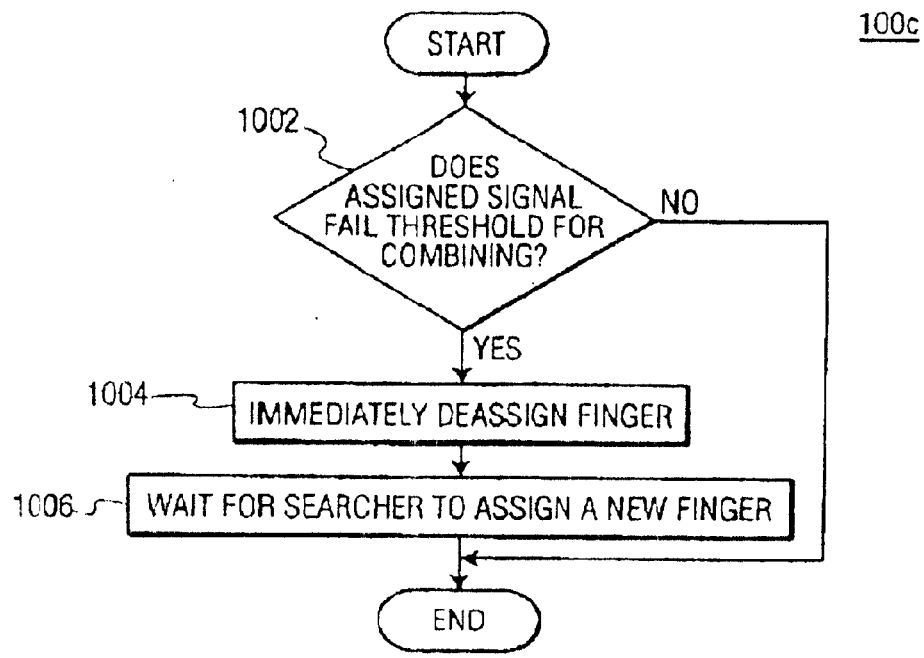
FIG. 1C is a flowchart of a conventional process used for implementing fingers in a communication device.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail, so as not to unnecessarily obscure aspects of the present invention.

Some portions of the detailed descriptions which follow, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "determining," "enabling," "preventing," "allowing," "demodulating," "performing," "categorizing," "evaluating," or the like, refer to the action and processes of a communication device or a similar electronic computing device, that manipulates and transforms data. The data is represented as physical (electronic) quantities within the communication device components, and is transformed into other data similarly represented as physical quantities within the communication device components, or other such information storage, transmission or display devices.

Figure 2:
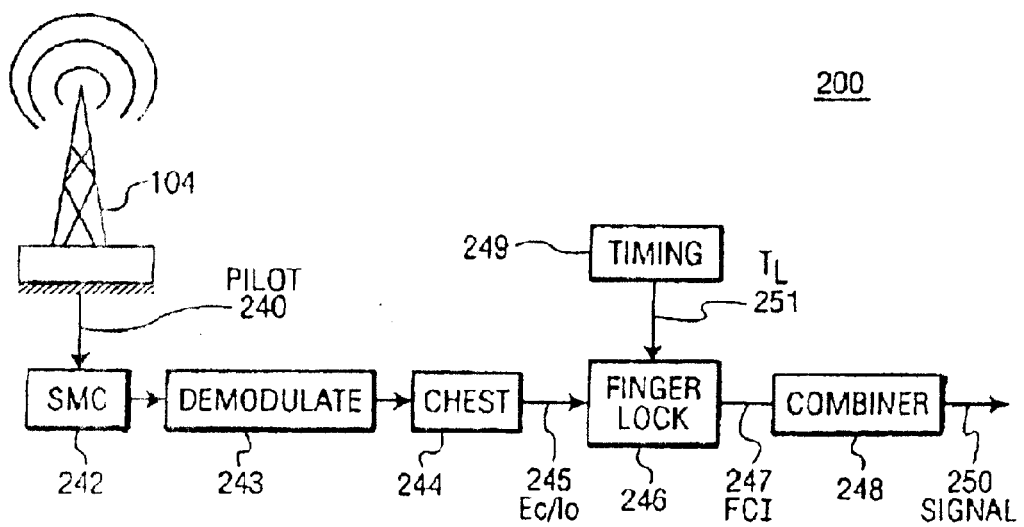
FIG. 2 is a block diagram of the management functions performed on a finger assignment in a communication device, in accordance with one embodiment of the present invention.

Referring now to FIG. 2, a block diagram of the management functions performed on a finger assignment in a communication device is shown, in accordance with one embodiment of the present invention. Block diagram 200 receives signal 240, transmitted from another device, e.g., base station 104. SMC Block 242 (Set Maintenance Central processing unit software) provides functions that such as channel estimation and searcher functions to retrieve and assign multipath signals from the PN space in the appropriate band for the communication device. SMC block 242 functions are well-known in the art.

Demodulating block 243 is coupled to SMC block 242. Demodulating block 243 performs the function of demodulating multipath signals using multiple demodulating fingers. The quantity of fingers used can vary widely, with the specific quantity of fingers upon a specific application goal and its available resources.

Channel estimating (CHEST) block 244 is coupled to demodulating block 243. CHEST block 244 provides a signal strength indication of a finger assignment. In one embodiment, CHEST block 244 is a new function that is separate from the channel estimator function performed by SMC block 242. In the present embodiment, CHEST block 244 performs dedicated channel estimation, and a more refined and accurate filtering operation, for a given multipath signal of the assigned finger. CHEST block 244 determines the $E_c/I_o$ ratio (e.g. received pilot energy per chip, $E_c$, divided by total received spectral density, $I_o$) and provides it, or a finger quality indicator (FQI), as output data 245 to the next block. In another embodiment, CHEST block 244 can use channel estimation data that was performed in the SMC block 242, and simply perform an additional filtering operation on that data. Channel estimators include functions that are well-known in the art for performing signal-strength calculations. For example, the CHEST block performs functions such as quadrature despreading, a sum and dump function, and an infinite impulse response (IIR) filter function. The IIR filter can have appropriate coefficients, e.g., forgetting factors, specifically determined for a specific application, given its performance goals and available resources.

Finger lock block 246 is coupled to demodulating block 243, which receives the FQI data 245. Finger lock block 246 performs a logic function that interprets the $E_c/I_o$ data 245 received from CHEST block 244 and/or timer data 251 received from timer block 249. Finger lock block evaluates signal strength data 245 and timer data 251 against appropriate signal-strength thresholds and/or time thresholds to decide whether the multipath signal should be deassigned, locked, or subsequently combined. Details on the quantity, type, and values of thresholds is described in more detail in subsequent figures. Finger lock block 246 provides a finger combine indicator (FCI) output data 247 to the next block to which it is coupled, e.g., the combiner block 248.

Combiner block 248 combines, if directed by the FCI data 247 from finger lock block 246, multipath signals that were demodulated by the assigned fingers. If FCI data indicates that a multipath signal demodulated by a finger assignment should not be combined, then combiner block 248 does not combine it. Alternatively, if FCI data from finger lock block 246 indicates that a multipath signal demodulated by a finger assignment should be combined, then combiner block 248 does combine it. Combiner block 248 provides composite signal output 250 that is decoded by subsequent function blocks that are not shown, but are well known in the art.

By using a CHEST block 244 to provide more accurate data on signal strength, and by using logic and multiple thresholds implemented by finger lock block 246 and timing block 249, the present invention provides an accurate and efficient buffer for holding assigned fingers during short-term fading. In contrast, the prior art would drop finger assignments during short term fading, and reassign them when they recovered, thus causing the undesirable effect of thrashing.

Figure 3:
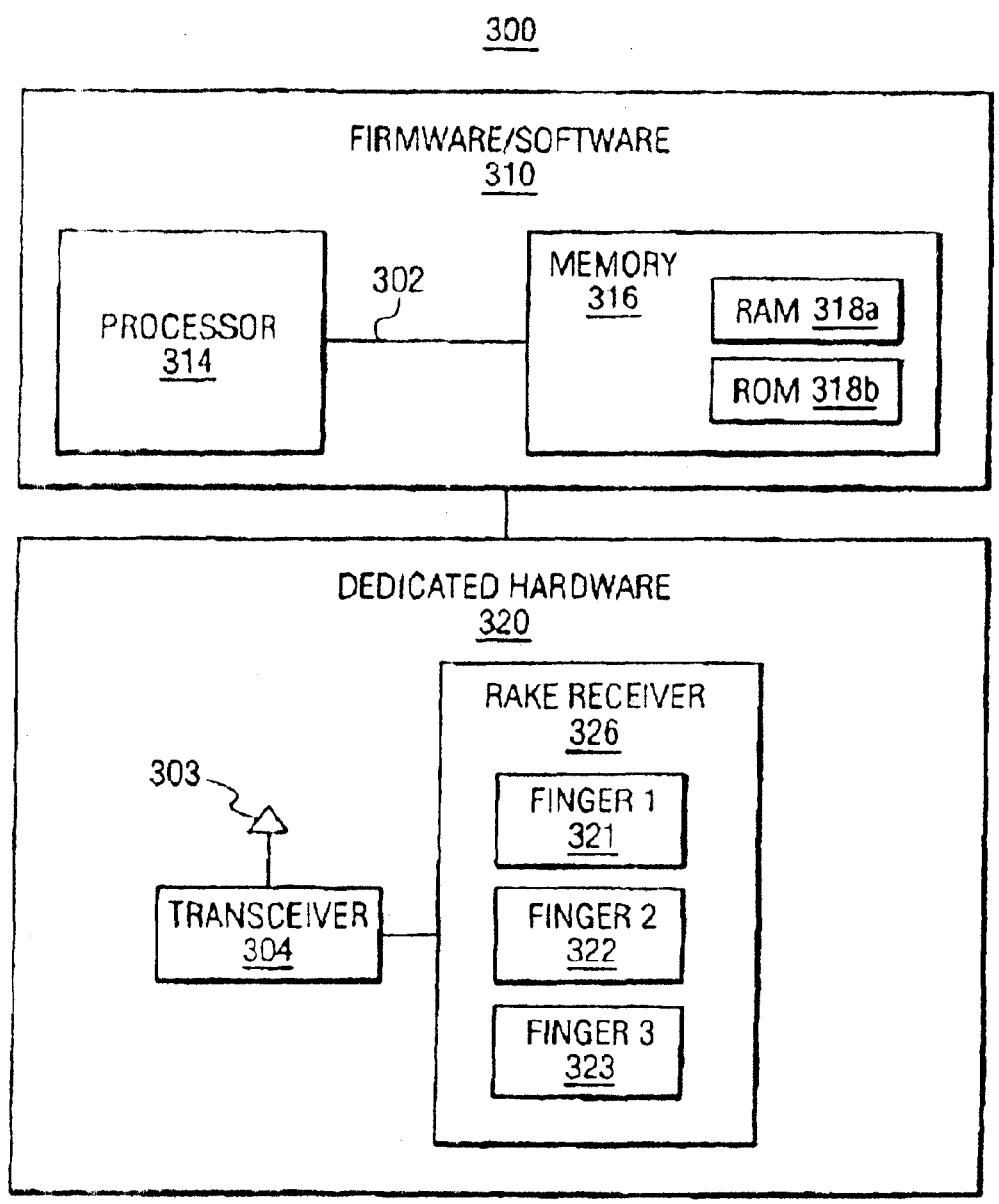
FIG. 3 is a block diagram of a communication device used for finger lock management of assigned fingers, in accordance with one embodiment of the present invention.

Referring now to FIG. 3, a block diagram of a communication device used for finger lock management of assigned fingers is shown, in accordance with one embodiment of the present invention. Communication device 300, e.g., a mobile or base unit, includes two general sections: firmware/software 310 and dedicated hardware 320. Firmware/software section 310 includes processor 314 and memory 316, coupled to each other via bus 302. Firmware/software section 310 can be a general purpose device, or a specialized digital signal processing (DSP) device. Alternatively, the functions performed by firmware/software section 310 can be implemented using a specialized state machine.

Hardware section 320 of FIG. 3 includes an antennae 303, a transceiver 304, and a rake receiver 326. Hardware section 320 is coupled to firmware/software portion 310 of communication device 310 to provide the raw data with which the firmware/software section can digitally process. Antennae 303 is coupled to transceiver 304, which is in turn coupled to rake receiver 326.

Bus 302 provides an exemplary coupling configuration of devices in communication system 300. Bus 302 is shown as a single bus line for clarity. It is appreciated by those skilled in the art that bus 302 can include subcomponents of specific data lines and/or control lines for the communication of commands and data between appropriate devices. It is further appreciated by those skilled in the art that bus 302 can include numerous gateways, interconnects, and translators, as appropriate for a given application.

The present embodiment of FIG. 3 shows that rake receiver 326 includes three fingers, e.g. finger 1 321, finger 2 322, and finger 3 323. However, the present invention is well-suited to using any quantity of fingers in rake receiver 326. Each finger 321–323 is coupled to transceiver 304 so that it may independently identify and demodulate its respective muitipath signal. By using a combination of hardware 320 and firmware 310, the present invention provides efficient and flexible management of finger assignments for multipath signals, as described more fully hereinafter.

Transceiver 304, processor 314, and memory 316 of FIG. 3 perform functions of SMC block 242 of FIG. 2, in one embodiment. Similarly, functions performed by demodulation block 243, channel estimator block 244, finger lock block 246, timer block 249, and combiner block 248 of FIG. 2 can be implemented by rake receiver 326, processor 314, and/or memory 316 of FIG. 3, in one embodiment.

It is also appreciated that communication system 300 is exemplary only and that the present invention can operate within a number of different communication systems. Furthermore, the present invention is well-suited to using a host of intelligent devices that have similar components as exemplary communication system 300.

Figure 4:
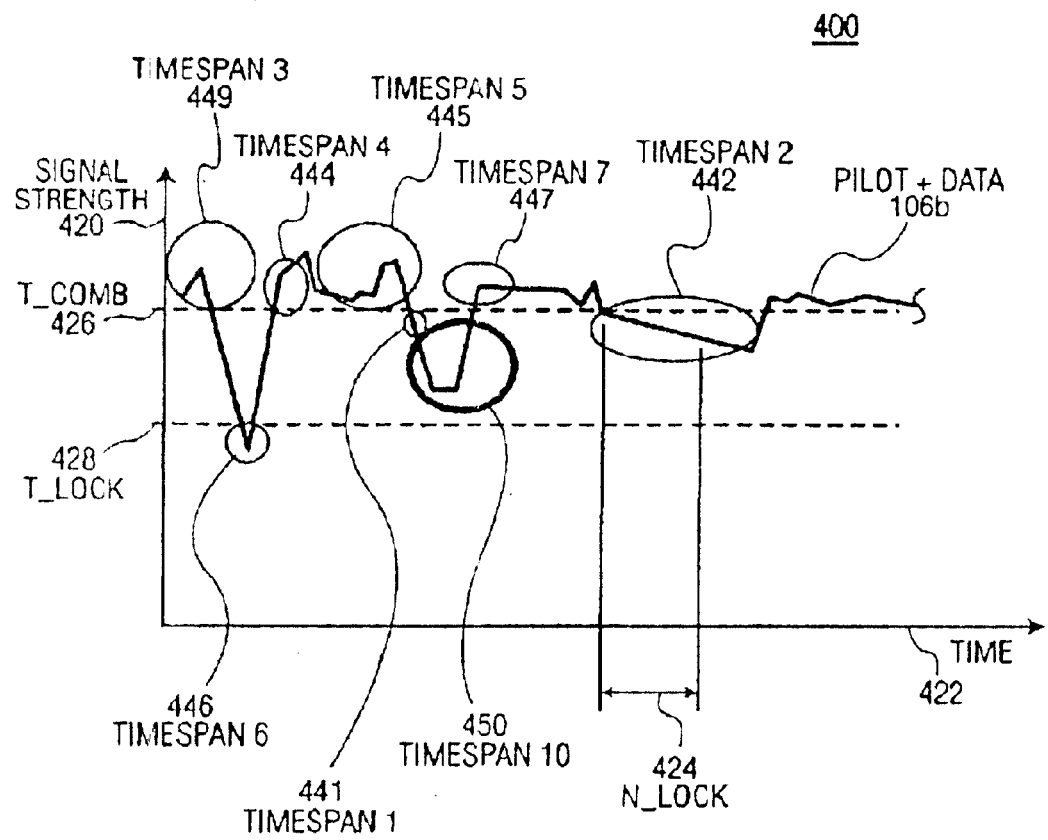
FIG. 4 is a graph of the performance of one assigned finger over time as compared with multiple performance thresholds, in accordance with one embodiment of the present invention.

Referring now to FIG. 4, a graph of the performance of one assigned finger over time as compared with multiple performance thresholds is shown, in accordance with one embodiment of the present invention. Subsequent figures will utilize this performance curve as an example to illustrate the functions and the present invention's processes, e.g. managing assigned fingers.

Graph 400 has an abscissa of time 422 and an ordinate of signal-strength 420. Signal-strength can represent absolute signal power or some version of signal to noise ratio (SNR) such as $E_c/I_c$, described hereinabove. Second multipath signal 106b is shown as an exemplary signal charted over a period of time. Graph 400 illustrates multiple thresholds used in the present invention. A first signal-strength threshold, Threshold Combine (T_COMB) 426, represents the threshold by which the management process of the present invention approves a finger assignment for a subsequent combine operation.

In conjunction with the T_COMB 426 threshold, the present embodiment also includes a second signal-strength threshold of Threshold Lock (T_LOCK) 428. In the present embodiment, T_LOCK 428 has a lower value than T_COMB 426. T_LOCK threshold 428, represents the threshold by which the management process of the present invention decides whether to lock or deassign a finger assignment.

The third, and final, threshold is a time threshold, N_LOCk 424, which relates to the amount of time that a multipath signal exists between the T_COMB 426 and T_LOCK 428 thresholds. While the present embodiment provides all three thresholds for evaluating the status of a multipath signal of a finger assignment (e.g. for a subsequent combine or deassign operation), the present invention is also suitable to using less than all three thresholds. The specific values T_LOCK 428, T_COMB 426, N_LOCK 424 can span a wide range of values, which are chosen depending upon requirements and assumptions for the specific application, hardware, and/or protocol used for a communication system.

Still referring to FIG. 4, timespan 9 449, timespan 4 444, timespan 5 445, and timespan 7 447, show performances of second multipath signal 106b that exceed T_COMB threshold 426. In contrast, timespan 6 446 shows a performance of second multipath signal 106b that fail to satiate T_COMB threshold 428. Finally, timespan 1 441, and timespan 10 450 show performances of second multipath signal 106b that exceed T_COMB threshold 426. Multiple system cycles can occur over any of the time spans listed in FIG. 4. Subsequent figures will refer to these specific timespan to illustrate the states and the processes of the present invention management of finger assignments.

Figure 5A:
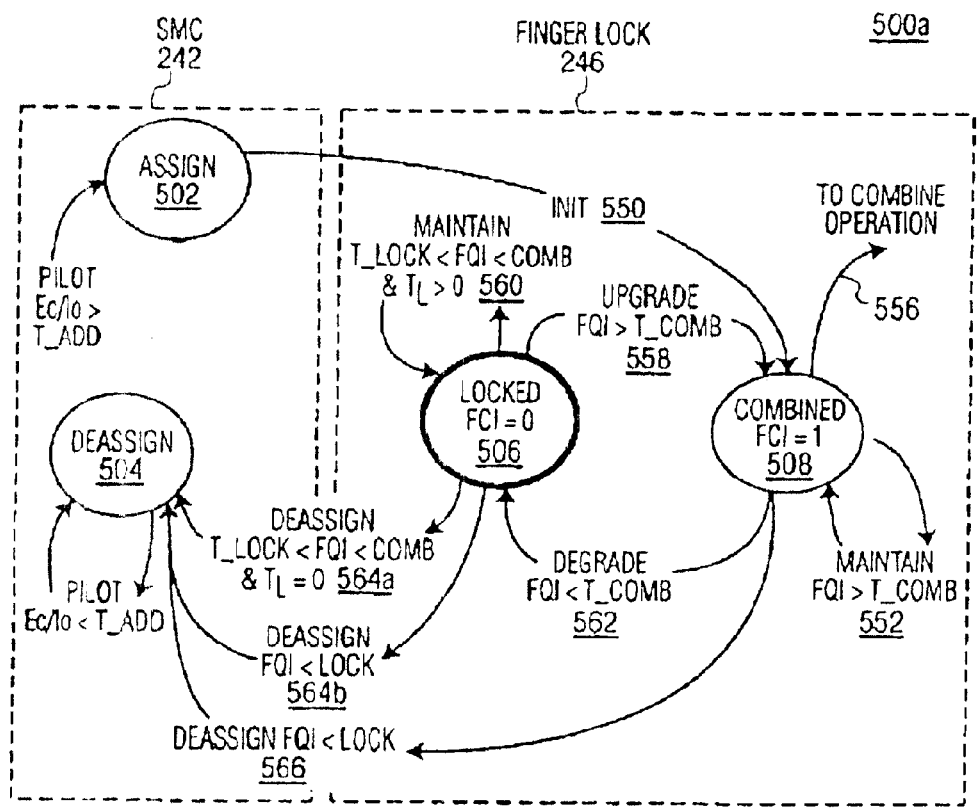
FIG. 5A is a state diagram of finger locking states into which a finger assignment can be categorized, in accordance with one embodiment of the present invention.

Referring now to FIG. 5A, a state diagram of finger locking states into which a finger assignment can be categorized is shown, in accordance with one embodiment of the present invention. State diagram 500a shows the virtual interaction between the states in which a finger assignment may be categorized and managed by the present invention. State diagram 500a will be used in subsequent figures to explain how the processes and equipment of the present invention effectively categorize and transition multipath signal finger assignments in these states. The thresholds referred to in FIG. 5A will be referenced to specific timespans of exemplary signal in FIG. 4 so as to provide explicit examples of state categorization and state transitions.

State diagram 500a of FIG. 5A shows states available for a multipath signal, as decided and provided by SMC (Set Maintenance Central processing unit (CPU)) software, e.g. by SMC block 242 of FIG. 2 described hereinabove. Multipath signals can have either of two states provided by SMC block 242 in FIG. 5A. The first state is an assigned state 502, having a prerequisite condition that the pilot portion of the multipath signal have a signal-strength, e.g. $E_c/I_o$, that is greater than (>) the threshold for adding (T_ADD). The T_ADD threshold used by a searcher is well-known in the art; its description is omitted herein for purposes of clarity. In the present embodiment, T_ADD has a lower value than either T_LOCK or T_COMB.

The second state provided by the SMC block 242 of FIG. 5A is a deassign state 504. One condition for maintaining a multipath signal, previously categorized in deassigned state 504, in the deassigned state 504, is when the pilot portion of the multipath signal has a signal-strength, e.g. $E_c/I_o$, that is less than (<) the threshold for adding (T_ADD). Multipath signals categorized in locked state 506 or combined state 508 can be degraded into deassigned state 504, as described hereinafter. These conditions will be described hereinafter.

Finger lock function block 246 also provides multiple states for a multipath signal as shown in state diagram 500a. The present embodiment shows that two states exist in finger lock function block 246. The first state is a combined state 508. One condition by which a multipath signal can be categorized in combined state 508 is via an initial condition 550. Initial condition 550 occurs when multipath signal is initially assigned, by SMC block 242, e.g. the multipath signal in question was not in a combined or locked state in the immediately preceding cycle of the management process. In the present embodiment, the FQI, e.g. $E_c/I_o$, does not necessarily need to satisfy T_LOCK or T_COMB thresholds, though it likely will. The initial condition occurs the first time a multipath signal designation (viz. specific PN offset) enters the assigned state. Timespan 9 449 of FIG. 4 illustrates this state change scenario, where it is assumed that multipath signal 106d has just been acquired by searcher in timespan 9 449. Timespan 4 444 of FIG. 4 also illustrates the state change scenario, where second multipath signal 106b has been deassigned by SMC block 242 at timespan 6 446, and thus appears as a new multipath signal assignment from SMC block 242.

Another condition whereby a multipath signal is categorized in combined state 508 is via an upgrade condition 558. Specifically, upgrade condition 558 occurs when a multipath signal previously categorized in the locked state 506 has a finger quality indicator (FQI) that exceeds (>) T_COMB threshold. Timespan 7 447 of FIG. 4 illustrates this state transition scenario where multipath signal 106b is in a locked state because its FQI>T_LOCK threshold, but its timespan at this FQI is less than the N_LOCK threshold. One condition that allows a multipath signal to remain categorized in combined state 508 is a maintain condition 552, whose criteria is that the FQI of the multipath signal is greater than T_COMB threshold. Timespan 5 445 of FIG. 4 illustrates this state scenario. A multipath signal categorized in combine state 508 is provided for a subsequent combine operation 556.

For a multipath signal categorized in combined state 508, the finger combine indicator (FCI) is set to one (1) to represent a state that the multipath signal can be combined in a subsequent combine operation. The FCI can represent an actual binary bit that can be a set or clear flag in a digital logic circuit or in software.

The second state in finger lock function 246 is a locked state 506. One condition by which a multipath signal may enter lock state 506 is downgrade condition 562 previously described. A multipath signal previously categorized in combined state 508 can be downgraded to a locked state 506 by downgrade condition 562. Downgrade condition 562 occurs if multipath signal has FQI that is less than T_COMB but greater than T_LOCK. Timespan 1 441 of FIG. 4 illustrates this state change scenario. Similarly, a multipath signal previously categorized in combined state 508 can be downgraded to the SMC function block 242, where it can be categorized in deassigned state 504 by downgrade condition 566. Downgrade condition 566 occurs if multipath signal has FQI that is less than T_LOCK for any period of time. Timespan 6 446 of FIG. 4 illustrates this state change scenario.

One condition in which a multipath signal presently categorized in locked state 506 can remain in locked state 506 is a maintain condition 560. Maintain condition 560 occurs for a multipath signal, previously categorized in locked state 506, whose FQI is less than T_COMB but greater than T_LOCK threshold, and whose timer has not exceeded time threshold, TL (e.g., TL is greater than zero for a countdown timer configuration). Timespan 10 450 of FIG. 4 illustrates this locked state scenario because its timespan is not greater than N_LOCK 424, by visual observation. The recovery of signal 106b from timespan 10 illustrates a short-fade condition that did not create thrashing in a communication system because of the present invention's finger assignment management system.

A multipath signal previously categorized in locked condition 506 is downgraded from locked condition 506 if it fails to satiate conditions for the lock state 506. Specifically, first downgrade condition 564a occurs if multipath signal has a FQI that is less than T_COMB threshold and greater than T_LOCK threshold, but whose timer has exceeded the time threshold, TL (e.g., timespan 2 442 of FIG. 4 illustrates this state change scenario because its timespan exceeds N_LOCK 424 threshold by visual observation). Second downgrade condition 564b occurs if multipath signal has a FQI that is less than T_LOCK threshold. Timespan 6 446 of FIG. 4 illustrates this state scenario, assuming it was categorized in lock state 506 at least once between timespan 9 449 and timespan 6 446. When multipath signals are downgraded from locked state 406, control of the finger is passed to SMC function 242. SMC can perform any function or state categorizing of multipath signal, such as categorizing it in deassigned state 504, where it will remain so long as the pilot $E_c/I_o$ is less than T_ADD.

Multipath signals categorized in locked state 506 are monitored by a timer, activated upon initial categorization into this state. Additionally, multipath signals categorized in locked state 506 have FCI set to zero (0) so that the multipath signal in question is not available for the subsequent combine operation. In one embodiment, each multipath signal finger assignment is independent of other multipath signal finger assignments. As such, more than one multipath signal can occupy any one of the states presented in FIG. 5A. While the present embodiment of FIG. 5A provides specific requirements for categorizing a multipath signal into a state, and for a transition between states, the present invention is well-suited to using alternative thresholds or conditions.

Figure 5B:
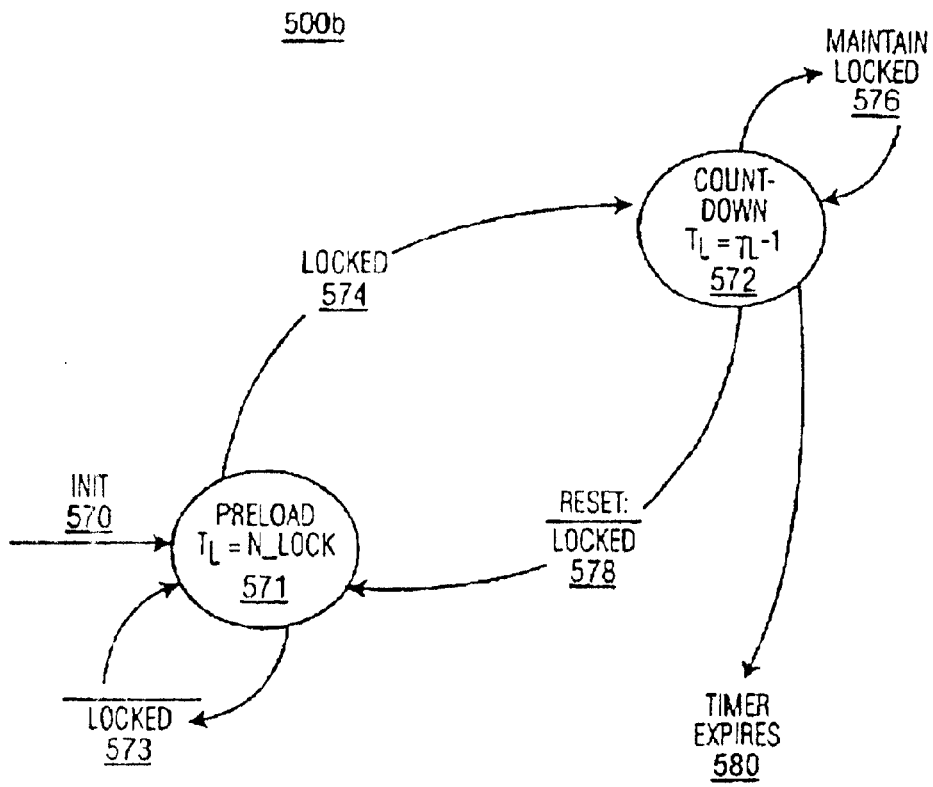
FIG. 5B is a state diagram of timing states into which a finger assignment can be categorized, in accordance with one embodiment of the present invention.

Referring now to FIG. 5B, a state diagram of timing states into which a finger assignment can be categorized is shown, in accordance with one embodiment of the present invention. State diagram 500b of FIG. 5B works in coordination with state diagram 500a of FIG. 5A, to provide the timer state portion of the conditions required for the state categorization and to provide the combine state changes of a multipath signal to satisfy the finger management process of the present invention, as described more fully in subsequent figures.

Timing diagram 500b includes two states, a preload state 570 and a count-down state 572. The present embodiment utilizes a count-down timer. However, the timer function can be accommodated by a count-up timer that is compared against a threshold, with appropriate indicating logic. The timer function can be implemented by hardware, such as timer block 328 of FIG. 3.

Preload state 570 sets the time threshold, TL, to N_LOCK 424, shown in FIG. 4. If the multipath signal does not enter a locked state, then it remains unlocked, per maintain condition 573. However, if multipath signal changes to a locked state, then the timer changes states per condition 574. The timer state can return from the countdown state 572 to preload state 570 if multipath signal becomes unlocked, per condition 578.

Countdown timer state 572 decrements the countdown timer for a given multipath signal. Multipath signal remains in countdown state if its signal-strength causes it to remain in a locked state, shown as condition 576. The decrement in countdown timer can be a sampling occurrence where signal quality is determined, e.g. once per system operational cycle. This decrement can be correlated to a desired specific time value. For example, timer threshold can be set for 10 cycles in a 5 MHz system, or 20 cycles in a 10 MHz system, to obtain the same duration of short-fade. The timer states can also change if the timer expires, shown as condition 580 in FIG. 5B. The timer expiration also causes a change in the finger locking states of the multipath signal, per FIG. 5A.

While state diagrams 500*a* and 500*b* of FIGS. 5A and 5B, in the present embodiment, define thresholds in terms of inequalities, e.g. operands such as ">" or "<," the present invention is also well-suited to using other operands such as "≧" or "≦" to define the pass/fail criteria for a threshold.

Figure 5C:
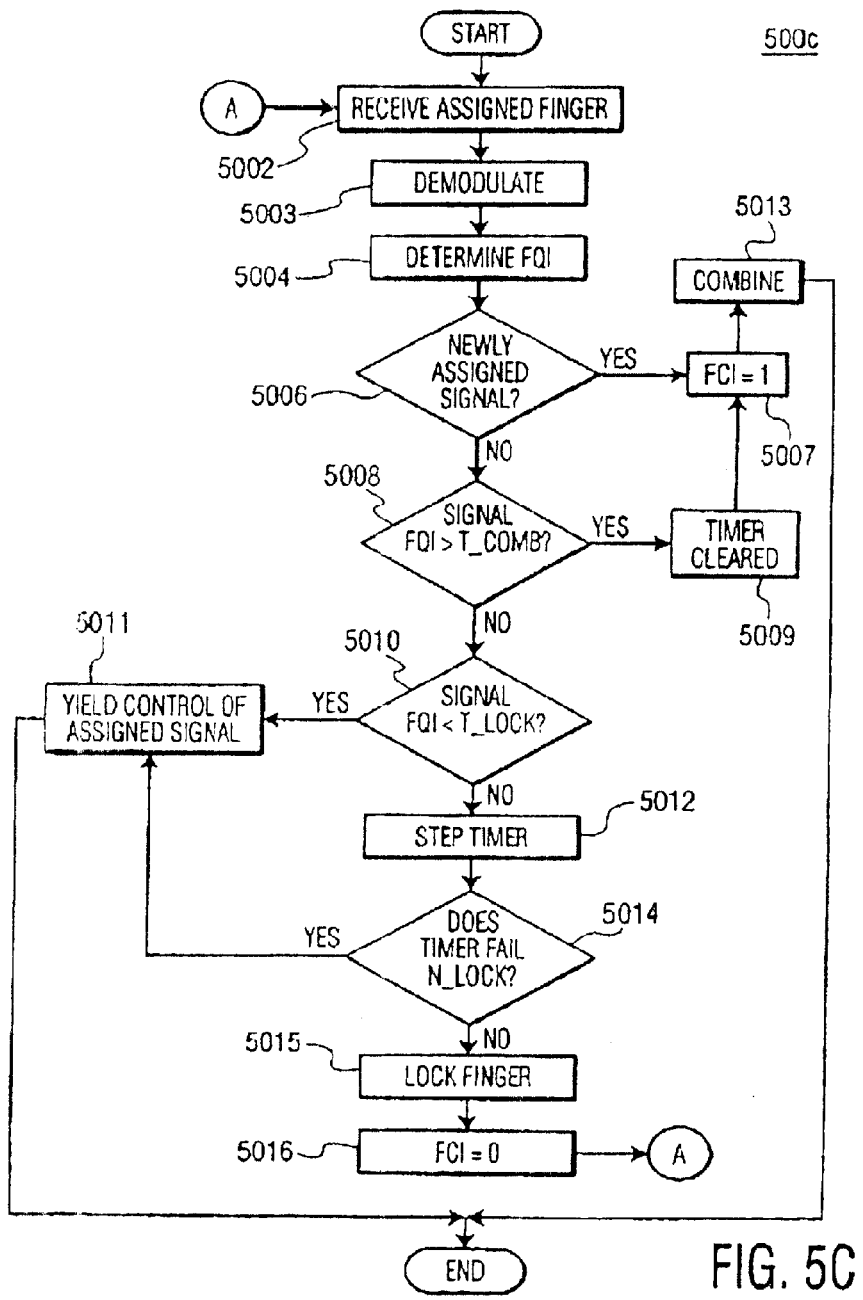
FIG. 5C is a flowchart of a process for implementing the state diagrams for finger locking states and for timing states in a communication device, in accordance with one embodiment of the present invention

Referring now to FIG. 5C, a flowchart of a process for implementing the state diagrams for finger locking states and for timing states in a communication device is shown, in accordance with one embodiment of the present invention. Flowchart 5000*c* essentially provides one embodiment of the sequence of queries that can satisfy the state categorizations and state transitions of FIGS. 5A and 5B. However, the present invention is well-suited to using alternative sequences, queries, and processes to accomplish the aforementioned state conditions. The steps of flowchart 5000*c* can be implemented by the various components of communication device 300 of FIG. 3. In particular, the queries and the logic of process 5000*c* can be implemented using a state machine or by using firmware/software 310 in combination with the hardware 320 components of communication device 300.

Process 5000*c* begins with step 5002. In step 5002 of the present embodiment, a finger assignment is received at communication device. Step 5002 is implemented, in one embodiment, by one of the fingers shown in rake receiver 326 shown in FIG. 2. The multipath signal has already been determined and assigned for a finger by SMC block 242, implemented in firmware/software 310 of communication device 300.

Following step 5002, process 5000*c* proceeds to step 5003.

In step 5003 of the present embodiment, the multipath signal assigned is demodulated by a finger. Step 5003 is accomplished, in one embodiment, by rake receiver portion 326 of communication device 300, shown in FIG. 3. Specifically, one of the multiple fingers is assigned to a signal finger, e.g. finger 1 321, in rake receiver 326. The demodulation step is well-known by those skilled in the art. Following step 5003, process 5000*c* proceeds to step 5006.

In step 5004 of the present embodiment, the finger quality indicator (FQI) is determined. Step 5004 is accomplished, in one embodiment, by software/firmware 310 portion of communication device 300. Step 5004 provides continuous signal-strength indicators, e.g. $E_c/I_c$ calculations, for a given multipath signal. Following step 5004, process 5000*c* proceeds to step 5006.

In step 5006 of the present embodiment, an inquiry determines whether the multipath signal is a newly assigned signal, e.g. the multipath signal was previously unassigned by a searcher. If the multipath signal is a newly assigned signal, then the process 5000*c* proceeds to step 5007. Alternatively, if the multipath signal is not a newly assigned signal, then process 5000*c* proceeds to step 5008. Step 5006 provides the logic for demodulating a newly acquired signal immediately, and thus avoiding latency associated with subsequent steps in process 5000*c*. Step 5006 is one implementation of the logic used to implement initial state condition 550 of state diagram 500*a* shown in FIG. 5A.

Step 5007 arises if the multipath signal is a newly assigned signal, per step 5006. In step 5007 of the present embodiment, a finger combine indicator (FCI) is set to a value of one (1). By setting FCI=1, step 5007 provides a bit flag that will enable, in the present embodiment, the assigned multipath signal to be combined in subsequent operation. The present invention is well-suited to using alternative logic and alternative devices to accomplish the step of enabling the multipath signal to be combined when the required performance conditions are satiated, e.g. per conditions of state diagrams in FIGS. 5A and 5B. Following step 5007, process 5000*c* proceeds to step 5013.

In step 5013 of the present embodiment, a combine operation is performed. Step 5013 is performed only on those signals with a FCI=1, which indicates that the signal is of sufficient quality to improve the overall composite signal that results from the combine operation. The alternative state of FCI=0 is discussed in a subsequent step. Step 5013 implements the combine operation 556 of state diagram 500*a* shown in FIG. 5A. Following step 5013, process 5000*c* ends.

Step 5008 arises if the assigned multipath signal is not a newly assigned signal, per step 5006. In step 5008 of the present embodiment, an inquiry determines whether the FQI is greater than the T_COMB threshold. If the multipath signal has an FQI greater than the T_COMB threshold, then the process 5000*c* proceeds to step 5009. Alternatively, if the multipath signal has an FQI that is not greater than the T_COMB threshold, then the process 5000*c* proceeds to step 5010. Step 5008 provides the logic for evaluating a first signal-strength threshold, T_COMB, shown in FIG. 4 as T_COMB threshold 426. Step 5008 is one implementation of the logic used to distinguish between combine state 508 and locked state 506, per state change condition 558, state change condition 562, and state maintain condition 560, of state diagram 500*a* shown in FIG. 5A.

Step 5009 arises if the multipath signal has an FQI greater than the T_COMB threshold, per step 5008. In step 5009 of the present embodiment, the timer is cleared.

This condition accounts for the scenario where the multipath signal has sufficient signal-strength, e.g. above T_COMB threshold, such that the timer threshold is not of concern. Consequently, the timer is cleared to remove any residual values or states that may have existed. This step can also be applicable for a newly assigned signal, per step 5006, though it is not part of the present embodiment. Following step 5009, process 5000*c* proceeds to step 5007, described hereinabove.

Step 5010 arises if the multipath signal has an FQI that is not greater than the T_COMB threshold, per step 5008. In step 5010 of the present embodiment, an inquiry determines whether the FQI of the multipath signal in question is less than the T_LOCK threshold. If the multipath signal has an FQI less than the T_LOCK threshold, then the process 5000*c* proceeds to step 5011. This condition accounts for the scenario where the multipath signal does not have sufficient signal-strength, e.g. below T_LOCK threshold, to even remain a potential candidate for combining. In particular, this scenario represents deep fading that is significant enough to render assigned multipath signal unworthy of a locked state. Alternatively, if the multipath signal has an FQI that is not less than the T_LOCK threshold, then the process 5000*c* proceeds to step 5012. This condition accounts for the scenario where the multipath signal does have sufficient signal-strength, e.g. above T_LOCK threshold, that it has a high probability of quickly returning to an even higher signal-strength, e.g. T_COMB, which is suitable for the subsequent combining operation.

Step 5010 provides the logic for evaluating a second signal-strength threshold, T_LOCK, shown in FIG. 4 as T_LOCK threshold 428. Step 5010 is one implementation of the logic used to distinguish between combine state 508 and locked state 506 and deassign state 504, per state change condition 564*b* and state maintain condition 560, of state diagram 500*a* shown in FIG. 5A.

Step 5011 can arise under several conditions, in the present embodiment. First, step 5011 can arise if the multipath signal has an FQI less than the T_LOCK threshold, per step 5010. Second, step 5011 can arise if a timer for multipath signal exceeds N_LOCK threshold, per step 5014. In step 5011, control of the finger assignment is yielded to the searcher, which will most likely deassign the multipath signal in question. However, the present invention is well-suited to alternative dispositions for multipath signal, other than the locked state. Because the multipath signal is removed from the locked state conditions, the timer is cleared to remove any residual values or states that may have existed. This step can also be applicable for a newly assigned signal, per step 5006, though it is not part of the present embodiment.

Step 5012 arises if the multipath signal has an FQI that is less than T_COMB threshold per step 5008 and an FQI that is greater than the T_LOCK threshold, per step 5010. In step 5012 of the present embodiment, the timer is stepped. This condition accounts for the scenario where the multipath signal has sufficient signal-strength e.g. above T_LOCK threshold, such that it has a high probably of quickly returning to an even higher signal-strength, e.g. T_COMB, suitable for the subsequent combining operation. However, to monitor the speed of the recovery of the signal-strength for the assigned multipath signal in question, the timer is stepped, or incremented. The timer can either be a count-up or a count-down timer, as previously discussed for FIGS. 2 and 3. Step 5012 can be implemented similarly to the implementation of step 5009. Following step 5012, process 5000*c* proceeds to step 5014.

In step 5014 of the present embodiment, an inquiry determines whether the timer designated for the assigned multipath signal in question fails to satisfy the N_LOCK threshold. In the present embodiment, the N_LOCK threshold 424 is shown in FIG. 4 as a given span of time. Thus, a multipath signal fails the threshold if the signal exceeds the amount of time provided by the N_LOCK threshold. If the multipath signal does exceed the N_LOCK threshold, then process 5000*c* proceeds to step 5011. Alternatively, if the multipath signal does not exceed the N_LOCK threshold, then process 5000*c* proceeds to step 5016. Step 5014 provides the logic for evaluating a time threshold for the signal-strength performance. That is, if the assigned multipath signal does not improve its signal-strength within the given period of time, e.g. N_LOCK, then it has a low probability of recovering from its fade condition. Step 5014 is one implementation of the logic used to distinguish between locked state 506 and deassigned state 504, per state change condition 564*a*, state maintain condition 560, of state diagram 500*a* shown in FIG. 5A. Step 5014 also provides one implementation of the logic used to accommodate the timing state diagram 500*b* of FIG. 5B.

Step 5015 arises if the multipath signal fails to satiate the timing threshold, N_COMB, per step 5014. Step 5015, in the present embodiment, locks the finger assignment. This step is indirectly accomplished by not allowing the finger assignment to be combined per step 5013 and by not yielding control of the assigned finger to the searcher, where it would most likely be deassigned. Thus, the present embodiment of a finger lock is temporarily implemented. Following step 5015, process 5000*c* proceeds to step 5016.

In step 5016 of the present embodiment, the finger combine indicator (FCI) is set to a value of zero (0). Step 5007 is accomplished, in a manner similar to that described in step 5007, discussed hereinabove, albeit opposite polarity. By setting FCI=0, step 5016 provides a bit flag that will disable, in the present embodiment, the assigned multipath signal from being combined in a subsequent operation. Following step 5016, process 5000*c* returns to step 5002.

Many of the instructions for the steps, and the data input and output from the steps of process 5000*c* can be implemented utilizing memory 316 and utilizing processor 314, as shown in FIG. 3. The memory storage for the present embodiment can either be permanent, such as read only memory (ROM), or temporary memory such as random access memory (RAM). Memory 316 can also be any other type of memory storage, capable of containing program instructions, such as a hard drive, a CD ROM, or flash memory. Furthermore, processor 314 can either be an existing system processor, or it can be a dedicated digital signal processing (DSP) processor. Alternatively, the instructions may be implemented using a microcontroller or a state machine.

While process 5000*c* of the present embodiment shows a specific sequence and quantity of steps, the present invention is suitable to alternative embodiments. For example, not all the steps provided for process 5000*c* are required for the present invention. And additional steps may be added to those presented. Likewise, the sequence of the steps can be modified depending upon the application. Furthermore, while process 5000*c* is shown as a single serial process, it can also be implemented as a continuous or parallel process.

Figure 6:
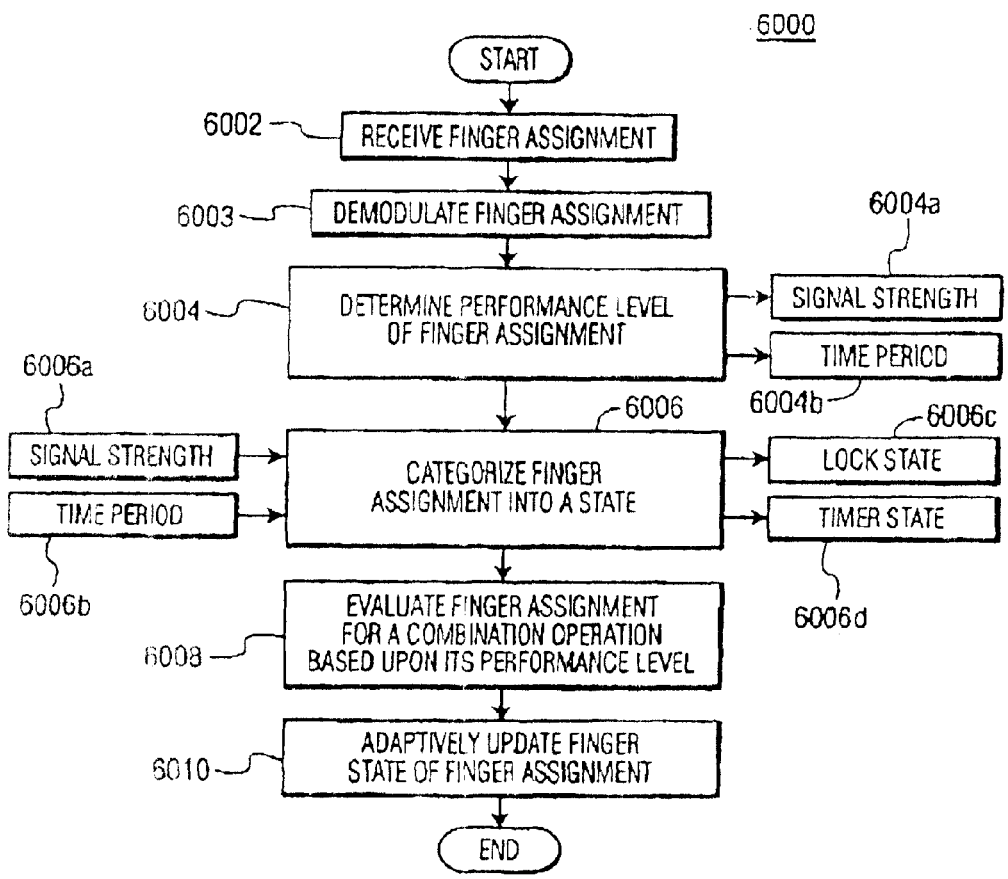
FIG. 6 is a flowchart of a process used for finger lock management of assigned fingers in a communication device, in accordance with one embodiment of the present invention.

Referring now to FIG. 6, a flowchart of the process used for finger lock management of assigned fingers in a communication device is shown, in accordance with one embodiment of the present invention. By using process 6000 embodiment, the present invention provides a method of implementing multiple thresholds, including an optional time threshold, to manage an assigned multipath signal for a demodulating finger. By adaptively managing the assigned multipath signal, the present invention avoids latency and thrashing problems associated with conventional communication systems. As a result of implementing the present invention, capacity, fidelity, and performance of a digital communication system is enhanced. The process of the present invention is applicable to any type of communication device, such as mobile units (e.g. cell phones) and base stations.

Process 6000 begins with step 6002. In step 6002 of the present embodiment, a finger assignment, e.g., an active multipath signal designation, is received at a communication device. Step 6002 is implemented, in one embodiment, using the function blocks described in FIG. 2, using the devices described in FIG. 3, and/or using the method described in FIG. 5C. Step 6002 is also well-suited to using the alternatives described for these function blocks, devices, and methods of prior figures. Following step 6002, process 6000 proceeds to step 6003.

In step 6003 of the present embodiment, the finger assignment is provided to a demodulating finger where it is demodulated. Step 6002 is implemented, in one embodiment, by step 5003 of FIG. 5C. Following step 6003, process 6000 proceeds to step 6004.

In step 6004 of the present embodiment, a performance level of a finger assignment is determined. Step 6002 is implemented, in one embodiment, by step. 5004 of FIG. 5C. However, step 6004 is well-suited to the alternative methods for determining a performance level of a finger mentioned for step 5004. Outputs from step 6004 include signal-strength 6004a and time period 6004b over which signal-strength 6004a exists. Outputs 6004a and 6004b can be implemented using the embodiments and alternatives provided in FIGS. 2 through 5C. Output 6004b of time period provides a useful tool for evaluating the duration of fading on the signal-strength of a finger assignment. This, in turn, allows the present invention to provide adaptive combining of the finger assignment based on the time and signal-strength thresholds. Following step 6004, process 6000 proceeds to step 6006.

In step 6006 of the present embodiment, the finger assignment is categorized into a state for a subsequent combine operation. Step 6002 includes, in one embodiment, inputs of signal-strength 6006a and time period 6006b over which the signal-strength exists. In another embodiment, a finger assignment can be categorized into a state depending only upon multiple signal-strength thresholds. In another embodiment, a finger can be categorized into a state depending upon an additional threshold of time. Step 6006 is implemented, in one embodiment, according to state diagrams 500a and 500b, shown in FIGS. 5A and 5B. The state machines are effectively implemented by state machines and/or software/firmware 310 portions of communication device 300. However, the present invention is well-suited to using alternative state diagrams, with a wide range of conditions used to determine a state change or a state maintenance for a given multipath signal. Step 6006 provides outputs of a lock state 6006c and a timer state 6006d. These outputs are implemented, in one embodiment, utilizing the state diagrams of FIGS. 5A and 5B, and utilizing the hardware 320 and software/firmware 310 portions of communication device 300 of FIG. 3. Following step 6006, process 6000 proceeds to step 6008.

In step 6008 of the present embodiment, the finger assignment is evaluated for a combination operation based upon its performance level. Step 6008 is implemented, in one embodiment, by evaluating the state in which the finger assignment has been categorized. The state is implicitly implemented using the finger combine indicator (FCI) flags, as described in FIG. 5C. This embodiment is implemented using hardware 320 and software/firmware portion 310 of communication device 300, as described for FIG. 3. The use of flag bits allows convenient and streamlined implementation of states for deciding on the combination operation for a given finger assignment. However, the present invention is well-suited to using an alternative method for implementing the decision to combine, lock, or deassign a finger assignment based on the multiple thresholds mentioned in the present embodiment. Following step 6008, process 6000 proceeds to step 6010.

In step 6010 of the present embodiment the states of a finger assignment are adaptively updated. Step 6010 is accomplished by the repeated implementation of process 5000c of FIG. 5C in a parallel or serial manner. The states can either be stored and updated in memory 316, or can be implemented by hardware, of communication device 300 of FIG. 3. Following step 6010, process 6000 ends.

While process 6000 of the present embodiment shows a specific sequence and quantity of steps, the present invention is suitable to alternative embodiments. For example, not all the steps provided for process 6000 are required for the present invention. And additional steps may be added to those presented. Likewise, the sequence of the steps can be modified depending upon the application. Furthermore, while process 6000 is shown as a single serial process, it can also be implemented as a continuous or parallel process.

Many of the instructions for the steps, and the data input and output from the steps of process 6000 can be implemented utilizing memory 216 and utilizing processor 214, as shown in FIG. 2. Memory storage 216 of the present embodiment can either be permanent, such as read only memory (ROM) 218b, or temporary memory such as random access memory (RAM) 218a. Memory 216 can also be any other type of memory storage, capable of containing program instructions, such as a hard drive, a CD ROM, or flash memory. Furthermore, processor 214 can either be a dedicated controller, an existing system processor, or it can be a dedicated digital signal processing (DSP) processor. Alternatively, the instructions can be implemented using some form of a state machine.

In view of the embodiments presented herein, the present invention effectively provides a method and apparatus for improving the capacity, fidelity, and performance of digital communication. More specifically, the embodiments show how the present invention provides a method that improves the power and the SNR of the signal received at mobile unit. The present invention provides a method of capturing a signal while avoiding the detrimental characteristics of fast fading variation encountered at the receiving unit, as illustrated by the embodiments. Significantly, the present invention solves the problem of latency caused by frequent or unnecessary changes in finger assignment. Finally, the present invention implements the aforementioned method of managing assigned fingers while avoiding the problem of thrashing.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method of managing a finger assignment in a wireless communication device, said method comprising the steps of:
   a) receiving said finger assignment from a searcher portion of said communication device;

b) determining a signal-strength for said finger assignment;

c) enabling said finger assignment for a combine operation if said signal-strength for said finger assignment satiates a first signal-strength threshold; and d) preventing said finger assignment from being deassigned if said signal-strength of said finger assignment satiates a second signal-strength threshold as a function of a predetermined time period, said second signal-strength threshold being less than said first signal-strength threshold.

2. The method recited in claim 1 further comprising the step of:

e) determining said time period over which said signal-strength of said finger assignment satiates said second signal-strength threshold.

3. The method recited in claim 2 further comprising the step of:

f) preventing said finger assignment from being deassigned if said time period satiates a time threshold.

4. The method recited in claim 2 further comprising the step of:

f) allowing said finger assignment to be deassigned if said finger assignment fails to satiate said time threshold.

5. The method recited in claim 1 further comprising the step of:

e) allowing said finger assignment to be deassigned if said finger assignment fails to satiate said second signal-strength threshold.

6. The method recited in claim 1 further comprising the step of:

e) demodulating said finger assignment.

7. The method recited in claim 1 further comprising the step of:

e) filtering said signal-strength of said finger assignment as determined in step b).

8. The method of claim 1 further comprising the step of:

e) categorizing said finger assignment into one of a plurality of states based upon said signal-strength of said finger assignment.

9. The method of claim 2 further comprising the step of:

f) categorizing said finger assignment into one of a plurality of states based upon said signal-strength of said finger assignment and based upon said time period over which said signals strength exists.

10. The method of claim 8 further comprising the step of:

f) evaluating said finger assignment for said combine operation or for deassignment based upon its state.

11. A wireless communication device for managing a finger assignment, said communication device comprising:

a transceiver;

a processor, said processor coupled to said transceiver; and a computer readable memory unit, said computer readable memory unit coupled to said processor, said computer readable memory unit containing program instructions stored therein that execute, via said processor, and cause the processor to perform the steps of:

a) receiving said finger assignment;

b) determining a signal-strength for said finger assignment;

c) enabling said finger assignment for a combine operation if said signal-strength for said finger assignment satiates a first signal-strength threshold; and d) preventing said finger assignment from being deassigned if said signal-strength of said finger assignment satiates a second signal-strength threshold as a function of a predetermined time period, said second signal-strength threshold being less than said first signal-strength threshold.

12. The method recited in claim 11 further comprising the step of:

e) determining said time period over which said signal-strength of said finger assignment satiates said second signal-strength threshold.

13. The method recited in claim 12 further comprising the step of:

f) preventing said finger assignment from being deassigned if said time period satiates a time threshold.

14. The method recited in claim 12 further comprising the step of:

f) allowing said finger assignment to be deassigned if said finger assignment fails to satiate said time threshold.

15. The method recited in claim 11 further comprising the step of:

e) allowing said finger assignment to be deassigned if said finger assignment fails to satiate said second signal-strength threshold.

16. The method recited in claim 11 further comprising the step of:

e) demodulating said finger assignment.

17. The method recited in claim 11 further comprising the step of:

e) filtering said signal-strength of said finger assignment as determined in step b).

18. The method of claim 11 further comprising the step of:

e) categorizing said finger assignment into one of a plurality of states based upon said signal-strength of said finger assignment.

19. The method of claim 12 further comprising the step of:

f) categorizing said finger assignment into one of a plurality of states based upon said signal-strength of said finger assignment and based upon said time period over which said signals strength exists.

20. The method of claim 18 further comprising the step of:

f) evaluating said finger assignment for said combine operation or for deassignment based upon its state.

21. A computer readable medium containing therein computer readable codes for causing an electronic device to implement a method of managing said multipath signals, said method comprising the steps of:

a) receiving said finger assignment;

b) determining a signal-strength for said finger assignment;

c) enabling said finger assignment for a combine operation if said signal-strength for said finger assignment satiates a first signal-strength threshold; and d) preventing said finger assignment from being deassigned if said signal-strength of said finger assignment satiates a second signal-strength threshold as a function of a predetermined time period, said second signal-strength threshold being less than said first signal-strength threshold.

22. The method recited in claim 21 further comprising the step of:

e) determining said time period, using said timer, over which said signal-strength of said finger assignment satiates said second signal-strength threshold.

23. The method recited in claim 22 further comprising the step of:

f) preventing said finger assignment from being deassigned if said time period satiates a time threshold.

24. The method recited in claim 22 further comprising the step of:
   f) allowing said finger assignment to be deassigned if said finger assignment fails to satiate said time threshold.

25. The method recited in claim 21 further comprising the step of:
   e) allowing said finger assignment to be deassigned if said finger assignment fails to satiate said second signal-strength threshold.

26. The method recited in claim 21 further comprising the step of:
   e) demodulating said finger assignment.

27. The method recited in claim 21 further comprising the step of:
   e) filtering said signal-strength of said finger assignment as determined in step b).

28. The method of claim 21 further comprising the step of:
   e) categorizing said finger assignment into one of a plurality of states based upon said signal-strength of said finger assignment.

29. The method of claim 22 further comprising the step of:
   f) categorizing said finger assignment into one of plurality of states based upon said signal-strength of said finger assignment and based upon said time period over which said signals strength exists.

30. The method of claim 28 further comprising the step of:
   f) evaluating said finger assignment for said combine operation or for deassignment based upon its state.

31. An arrangement for managing a finger assignment in a wireless communication device, said arrangement comprising:
   means for receiving said finger assignment from a searcher portion of said communication device;
   means for determining a signal-strength for said finger assignment;
   means for enabling said finger assignment for a combine operation if said signal-strength for said finger assignment satiates a first signal-strength threshold;
   means for preventing said finger assignment from being deassigned if said signal-strength of said finger assignment satiates a second signal-strength threshold, said second signal-strength threshold being less than said first signal-strength threshold; and
   means for determining a time period over which said signal-strength of said finger assignment satiates said second signal-strength threshold.

* * * * *